United States Patent
Benjebbour et al.

(10) Patent No.: US 9,344,241 B2
(45) Date of Patent: *May 17, 2016

(54) RADIO COMMUNICATION SYSTEM, BASE STATION APPARATUS, MOBILE TERMINAL APPARATUS, AND INTERFERENCE MEASUREMENT METHOD

(71) Applicant: NTT DOCOMO, INC., Tokyo (JP)

(72) Inventors: Anass Benjebbour, Tokyo (JP); Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 37 days.

This patent is subject to a terminal disclaimer.

(21) Appl. No.: 14/356,411

(22) PCT Filed: Nov. 7, 2012

(86) PCT No.: PCT/JP2012/078796
§ 371 (c)(1),
(2) Date: May 6, 2014

(87) PCT Pub. No.: WO2013/069664
PCT Pub. Date: May 16, 2013

(65) Prior Publication Data
US 2014/0301340 A1    Oct. 9, 2014

(30) Foreign Application Priority Data

Nov. 7, 2011  (JP) .................................. 2011-243984

(51) Int. Cl.
*H04W 4/00*    (2009.01)
*H04L 5/00*    (2006.01)
(Continued)

(52) U.S. Cl.
CPC ........... *H04L 5/0048* (2013.01); *H04J 11/0023* (2013.01); *H04L 5/0035* (2013.01); *H04L 27/261* (2013.01); *H04W 24/10* (2013.01); *H04J 11/0053* (2013.01); *H04L 5/0073* (2013.01)

(58) Field of Classification Search
USPC ........... 370/252–329, 330–336; 455/450–509
See application file for complete search history.

(56) References Cited

U.S. PATENT DOCUMENTS 8,289,917 B1 * 10/2012 Koivisto .............. H04L 5/0048
                                                    370/252
8,305,987 B2 * 11/2012 Fong .................... H04L 5/0035
                                                    370/329

(Continued)

FOREIGN PATENT DOCUMENTS

JP    2011-142437 A    7/2011
WO    2008/099785 A1    8/2008

(Continued)

OTHER PUBLICATIONS

International Search Report issued in PCT/JP2012/078796 mailed on Feb. 12, 2013 (2 pages).

(Continued)

*Primary Examiner* — Man Phan
(74) *Attorney, Agent, or Firm* — Osha Liang LLP

(57) ABSTRACT

The present invention is designed to measure interference with high accuracy, without changing the density of CSI-RSs, in a future system that does not reply on CRSs. A base station apparatus (20) allocates CSI-RS to CSI resources that are defined for CSI-RS transmission, changes arbitrary resources in the CSI-RS resources in resource block units or in resource block group units, and determines and reports to a mobile terminal apparatus (10) the resources to be muted, and the mobile terminal apparatus (10) is configured to measure interference using the muted resources.

10 Claims, 16 Drawing Sheets

(51) Int. Cl.
 *H04W 24/10* (2009.01)
 *H04J 11/00* (2006.01)
 *H04L 27/26* (2006.01)

(56) References Cited

U.S. PATENT DOCUMENTS

| | | | | |
|---|---|---|---|---|
| 8,478,190 B2* | 7/2013 | Sayana | ................... | H04B 7/024 |
| | | | | 455/7 |
| 8,665,692 B2* | 3/2014 | Koivisto | ................ | H04B 7/024 |
| | | | | 370/204 |
| 8,937,929 B2* | 1/2015 | Abe | ........................ | H04L 5/007 |
| | | | | 370/252 |
| 8,964,663 B2* | 2/2015 | Gaal | ....................... | H04L 5/003 |
| | | | | 370/252 |
| 9,130,725 B2* | 9/2015 | Gaal | ..................... | H04L 5/0058 |
| 2010/0048151 A1 | 2/2010 | Hara | | |
| 2011/0170435 A1 | 7/2011 | Kim et al. | | |
| 2011/0230144 A1* | 9/2011 | Siomina | ................ | H04L 5/0044 |
| | | | | 455/68 |
| 2012/0120903 A1* | 5/2012 | Kim | ....................... | H04B 7/024 |
| | | | | 370/329 |
| 2012/0300652 A1 | 11/2012 | Kishiyama et al. | | |
| 2012/0315859 A1* | 12/2012 | Lee | ....................... | H04J 11/005 |
| | | | | 455/67.13 |
| 2013/0010750 A1 | 1/2013 | Hoshino et al. | | |
| 2013/0040673 A1* | 2/2013 | Siomina | ................ | H04W 64/00 |
| | | | | 455/501 |
| 2013/0182648 A1* | 7/2013 | Abe | ....................... | H04L 5/0048 |
| | | | | 370/328 |

FOREIGN PATENT DOCUMENTS

| | | |
|---|---|---|
| WO | 2011/055986 A2 | 5/2011 |
| WO | 2011/118141 A1 | 9/2011 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN); (Release 7)"; Sep. 2006 (57 pages).

Office Action in counterpart Japanese Patent Application No. 2011-243984 issued on Oct. 27, 2015 (7 pages).

Office Action in counterpart Japanese Patent Application No. 2011-243984 issued on Mar. 8, 2016 (4 pages).

* cited by examiner

RADIO COMMUNICATION SYSTEM, BASE STATION APPARATUS, MOBILE TERMINAL APPARATUS, AND INTERFERENCE MEASUREMENT METHOD

TECHNICAL FIELD

The present invention relates to a radio communication system, a base station apparatus, a mobile terminal apparatus and an interference measurement method in a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, a transmission rate of maximum approximately 2 Mbps can be achieved on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of the LTE system are also under study for the purpose of achieving further broadbandization and higher speed (which may be referred to as, for example, LTE-Advanced or LTE enhancement (hereinafter "LTE-A")).

In the downlink of the LTE system (for example, Rel. 8), a CRS (Cell-specific Reference Signal) is defined. CRSs are used to demodulate user data, and, besides, used to measure downlink channel quality (CQI: Channel Quality Indicator) for scheduling and adaptive control, and so on. Meanwhile, in successor systems of LTE (for example, Rel. 10), a CSI-RS (Channel State Information-Reference Signal) is defined as a reference signal to determine CSI (Channel State Information).

CITATION LIST

Non-Patent Literature

Non-Patent Literature 1: 3GPP, TR25.912 (V7.1.0), "Feasibility Study for Evolved UTRA and UTRAN," September 2006

SUMMARY OF THE INVENTION

Technical Problem

Now, when CQI is measured on the mobile terminal apparatus side, the accuracy of interference measurement becomes important. Although interference is measured using CRSs in such systems, the possibility is low that this interference measurement method will be adopted in the future because radio interfaces that do not rely upon CRSs are under study for future use. Meanwhile, when interference is measured using CSI-RSs, it is difficult to measure interference with high accuracy because the density of CSI-RSs is low. In this case, although a method to increase the density of CSI-RSs and measure interference may be possible, it is still difficult to satisfy backward compatibility.

The present invention has been made in view of the above, and it is therefore an object of the present invention to provide a radio communication system, a base station apparatus, a mobile terminal apparatus, and an interference measurement method, whereby interference can be measured with high accuracy, without changing the density of CSI-RSs, in a future system that does not rely on CRSs.

Solution to Problem

A radio communication system according to the present invention is a radio communication system to include a mobile terminal apparatus that is able to receive a reference signal for channel state measurement, and a base station apparatus that transmits the reference signal to the mobile terminal apparatus, and, in this radio communication system, the base station apparatus has a reference signal allocation section that allocates the reference signal to reference signal resources that are defined for transmission of the reference signal, a muting determining section that changes arbitrary resources in the reference signal resources in resource block units or in resource block group units, a resource block group being formed with a plurality of resource blocks, and determines resources that are muted, and a reporting section that reports the resources that are muted per resource block or per resource block group, to the mobile terminal apparatus, and the mobile terminal apparatus comprises an interference measurement section that measures interference using the muted resources.

Technical Advantage of the Invention

According to the present invention, interference is measured using resources that are muted, so that, compared to the case where interference is measured using resources to which data such as reference signals is allocated, interference from other transmission points can be measured with high accuracy. Also, since the resources to be muted are changed in resource block units or in resource block group units at individual transmission points, the possibility that resources to be muted overlap between a plurality of transmission points decreases. Consequently, interference from other transmission points can be measured using resources where the majority of the resource blocks are muted, so that it is possible to improve the accuracy of measurement.

DESCRIPTION OF EMBODIMENTS

Figure 1A:
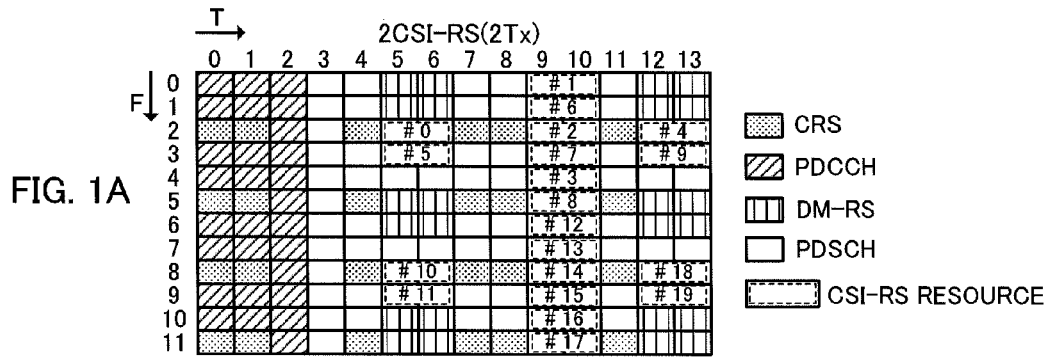
FIG. 1 provides diagrams to explain CSI-RS allocation patterns in resource blocks.
Figure 1B:
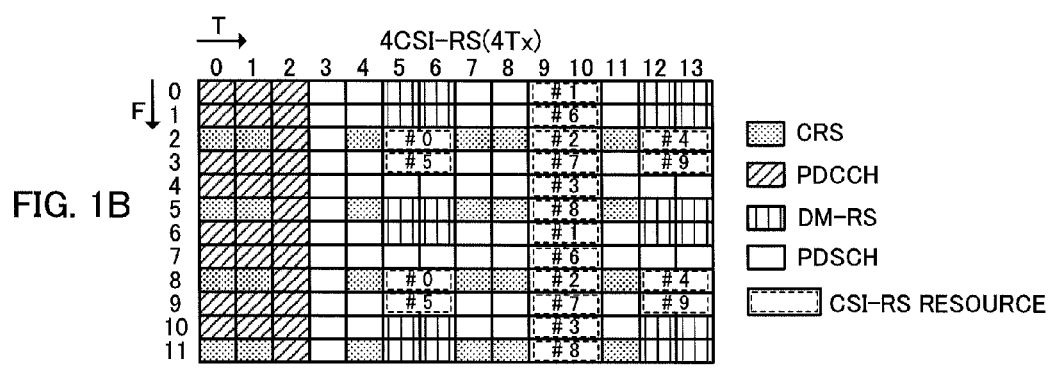

First, a CSI-RS, which is one of the reference signals adopted in successor systems of LTE (for example, Rel. 10), will be described with reference to FIG. 1. A CSI-RS is a reference signal that is used to measure CSI, such as CQIs (Channel Quality Indicators), PMIs (Precoding Matrix Indicators), and RIs (Rank Indicators), as the channel state. Unlike CRSs (Cell-specific Reference Signals) that are allocated in all subframes, CSI-RSs are allocated in a predetermined cycle—for example, in a 10-subframe cycle. Also, CSI-RSs are specified by parameters such as position, sequence and transmission power. The positions of CSI-RSs include subframe offset, cycle, and subcarrier-symbol offset (index).

Note that non-zero-power CSI-RSs and zero-power CSI-RSs are defined as CSI-RSs. Non-zero-power CSI-RSs correspond to resources where CSI-RSs are allocated, and zero-power CSI-RSs correspond to muted resources (Resource elements (REs)).

In one resource block defined in LTE, CSI-RSs are allocated not to overlap with control signals such as the PDCCH (Physical Downlink Control Channel), user data such as the PDSCH (Physical Downlink Shared Channel), and other reference signals such as CRSs and DM-RSs (Demodulation-Reference Signals). One resource block is formed with twelve subcarriers that are consecutive in the frequency direction and fourteen symbols that are consecutive in the time axis direction. From the perspective of suppressing PAPR, resources that can transmit CSI-RSs are allocated two resource elements that neighbor each other in the time axis direction, as a set.

In the CSI-RS configurations shown in FIG. 1, forty resource elements are secured as CSI-RS resources (reference signal resources). In these forty resource elements, CSI-RS patterns (CSI configurations) are set according to the number of CSI-RS ports (for example, the number of antennas). In each CSI-RS pattern, one resource element is allocated for a CSI-RS, for every one CSI-RS port.

When the number of CSI-RS ports is two, in forty resource elements, two resource elements are allocated CSI-RSs. Accordingly, in FIG. 1A, twenty CSI-RS patterns, designated by indices #0 to #19 (CSI configurations=0 to 19), are set. Here, for ease of explanation, resource elements constituting the same one pattern are assigned the same index.

When the number of CSI-RS ports is four, in forty resource elements, four resource elements are allocated CSI-RSs. Consequently, in FIG. 1B, ten CSI-RS patterns, designated by indices #0 to #9 (CSI configurations=0 to 9), are set. Note that, in CSI-RS patterns, user data is allocated to resource elements where no CSI-RS is allocated.

Figure 1C:
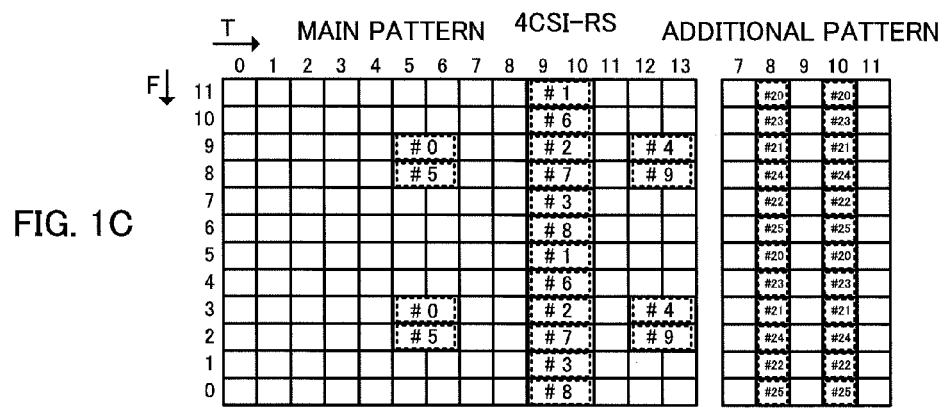

Furthermore, with CSI-RSs, interference between cells is reduced by selecting different CSI-RS patterns on a per cell basis. Also, in addition to the FDD normal patterns shown in FIGS. 1A and 1B, CSI-RS patterns may use TDD additional patterns as an FDD option, as shown in FIG. 1C. Furthermore, extended patterns (not shown), which are extended FDD normal patterns, may be used as well. Also, CSI-RS patterns in which the number of CSI-RS ports is eight, may be used as well. In the following description, examples of FDD normal patterns will be described for ease of explanation.

Figure 2A:
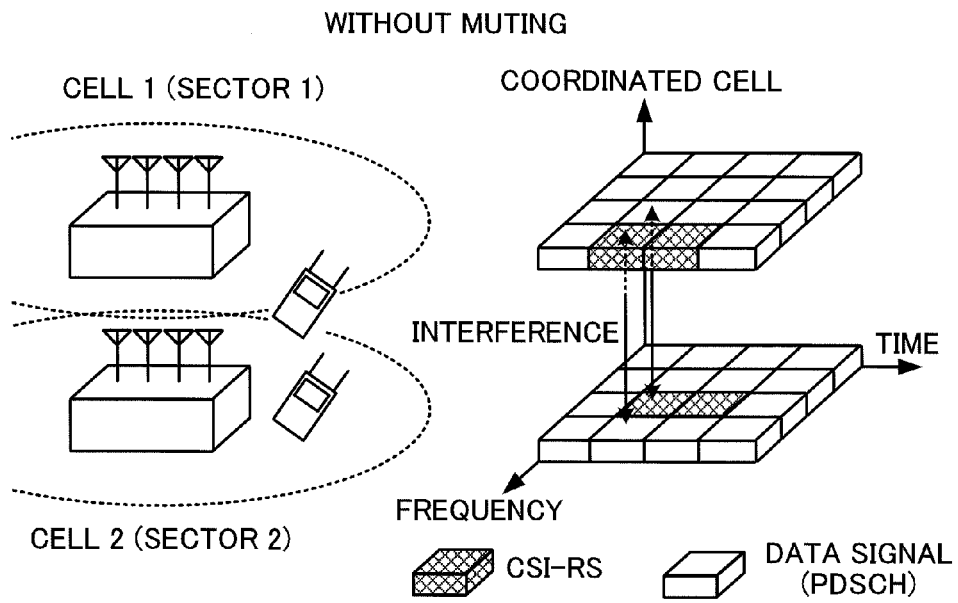
FIG. 2 provides diagrams to explain muting in CQI measurement using CSI-RSs.

In CSI measurement using such CSI-RSs, cases might occur where the accuracy of measurement is damaged by data interference from neighboring cells. For example, as shown in FIG. 2A, user data is allocated to the downlink resource blocks of cell C1 that correspond to the CSI-RS of neighboring cell C2. Also, user data is allocated to the downlink resource blocks of cell C2 that correspond to the CSI-RS of neighboring cell C1. Such user data constitutes interference components against the CSI-RS in each cell, and becomes a factor to damage the accuracy of CSI measurement in mobile terminal apparatuses that are located in the border between cell C1 and cell C2.

Figure 2B:
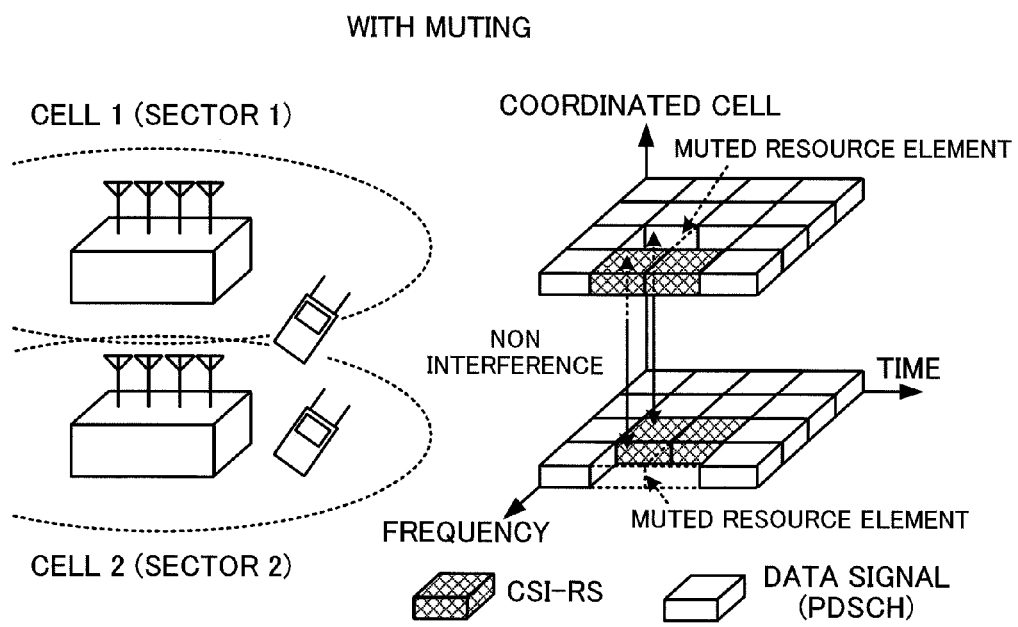

To improve the deterioration of the accuracy of CSI measurement due to the positions where user data is allocated, muting is defined in Rel. 10. In muting, user data is not allocated to resources that correspond to the CSI-RS of a neighboring cell, as shown in FIG. 2B. The downlink resource blocks of cell C1 that correspond to the CSI-RS of cell C2 are muted. Also, the downlink resource blocks of cell C2 that correspond to the CSI-RS of cell C1 are muted. Given this configuration, the accuracy of CSI measurement in mobile terminal apparatuses is improved by eliminating interference components against CSI-RSs due to user data of neighboring cells.

Note that the resources to be muted may be defined as resources where transmission power is made 0, or may be defined as resources to be transmitted with such transmission power that does not cause interference against the CSI-RSs of neighboring cells (transmission points). Furthermore, muted resources may be defined as resources where no data is allocated, or may be defined as resources where data is allocated to an extent where no interference is caused against the CSI-RSs of neighboring cells (transmission points).

Now, when CQIs are calculated based on CSI-RSs, the accuracy of interference measurement becomes important. In successor systems of LTE, interference measurement to use CSI-RSs is also under study as an interference measurement method that does not rely on CRSs. However, since CSI-RSs have low density in one resource block and are not only used in interference measurement and are also used in channel estimation, interference from other transmission points (TPs) cannot be measured with high accuracy. Also, although a method to increase the density of CSI-RSs may be possible, it is still difficult to achieve backward compatibility. Note that a transmission point covers not only a cell where a different cell ID from that of another cell is allocated, but also covers, for example, a cell where the same cell ID as that of another cell is allocated.

Figure 3A:
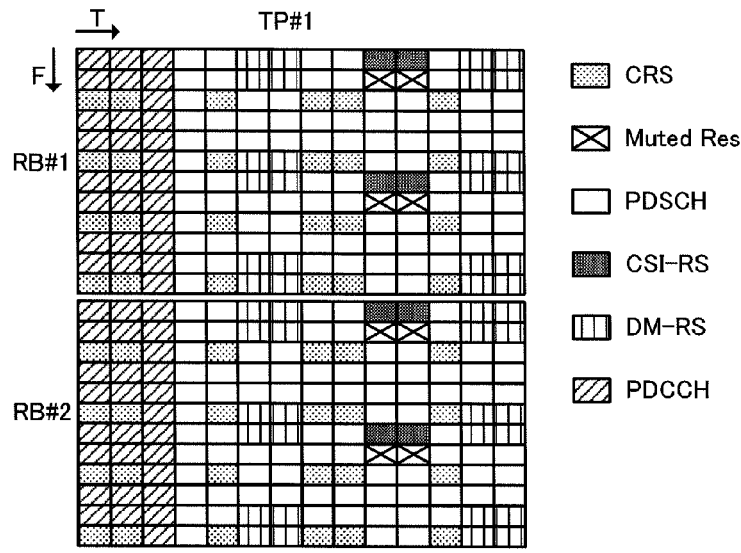
FIG. 3 provides diagrams each showing an example of an interference measurement method.

To solve these problems, as shown in FIG. 3A, a method of measuring interference using muted resources may be possible. In this case, the same resources are muted uniformly in all resource blocks. There is no transmission of various data or execution of channel estimation in the muted resources, so that interference from other transmission points is measured with high accuracy. Also, it is not necessary to increase the density of CSI-RSs in one resource block, so that it is possible to achieve backward compatibility.

Figure 3B:
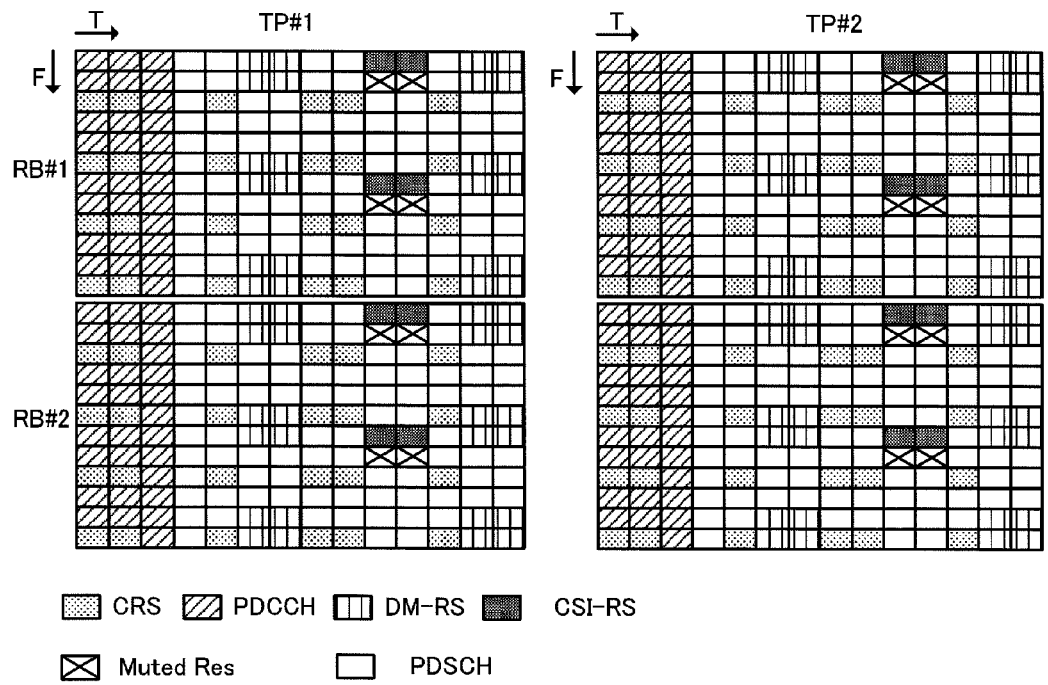

However, the orthogonality of muted resources is not guaranteed between a plurality of transmission points, and therefore there is a possibility that muted resources may overlap between a plurality of transmission points, as shown in FIG. 3B. Consequently, interference ceases to exist when in fact interference is produced between a plurality of transmission points, and therefore the accuracy of interference measurement is damaged.

So, the present inventors have arrived at the present invention in order to solve these problems. That is, a gist of the present invention is to reduce the possibility that muted resources overlap between a plurality of transmission points, by randomizing the positions to set muting in a base station apparatus. By this means, on the mobile terminal apparatus side, it is possible to measure interference from other transmission points using muted resources, and therefore improve the accuracy of interference measurement.

Figure 4:
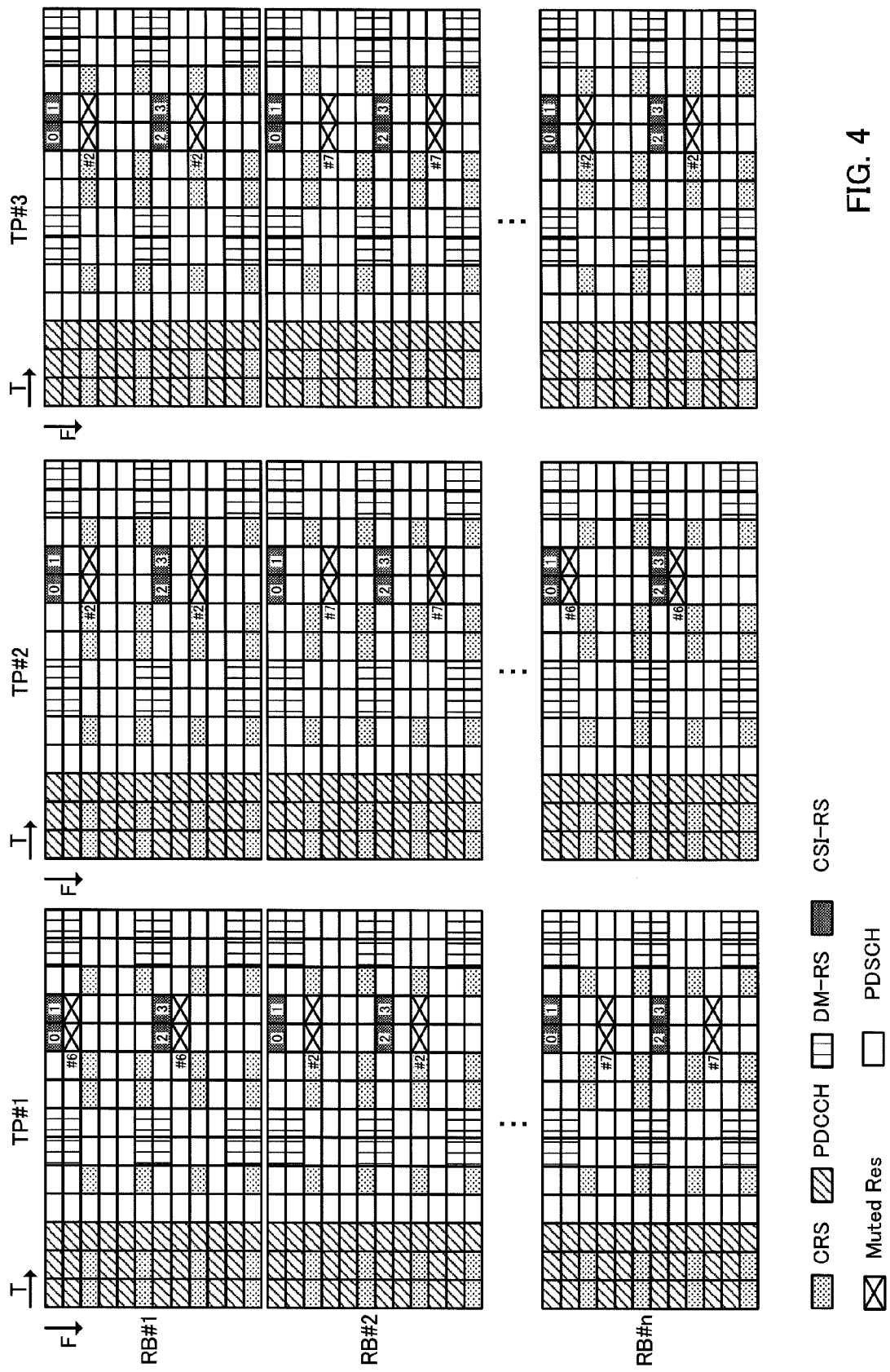
FIG. 4 is a diagram to show an example of a method of setting muting.

Here, the method of setting muting according to the present embodiment will be described with reference to FIG. 4. FIG. 4 provides diagrams each showing an example of a method of setting muting. Note that although FIG. 4 shows an example of transmitting CSI-RSs with four transmission ports for ease of explanation, this configuration is by no means limiting. The present invention is also applicable to configurations to transmit CSI-RSs with two transmission ports and eight transmission ports. Note that "0" to "3" in FIG. 4 represent the CSI-RS port numbers.

As shown in FIG. 4, at each transmission point (TP) #1 to #3, the positions to set muting (muting pattern) are hopped between resource blocks. For example, at transmission point #1, in resource block #1, muting is set in the CSI-RS resources designated by index #6, and, in resource block #2, muting is set in the CSI-RS resources designated by index #2. In this way, at transmission point #1, the muting pattern is randomized in resource block units. Note that the muting pattern may also be referred to as "PDSCH hole pattern," or may be referred to as "Zero Power CSI-RS pattern."

Similarly, also in resource blocks #1 to #n of transmission points #2 and #3, the muting pattern is randomized. For example, in transmission points #2 and #3, in resource block #1, muting is set in the CSI-RS resources designated by index #2, and, in resource block #2, muting is set in the CSI-RS resources designated by index #7.

In this way, the muting pattern to be set on a per resource block basis is randomized at each transmission point, so that the possibility that the muting pattern overlaps between a plurality of transmission points decreases. For example, the user data that is allocated in resource block #1 for transmission points #2 and #3 corresponds to CSI-RS resources where muting is set, in resource block #1 for transmission point #1. Also, the user data that is allocated in resource block #2 for transmission points #2 and #3 corresponds to CSI-RS resources where muting is set, in resource block #2 for transmission point #1.

Consequently, in resource blocks #1 and #2 of transmission point #1, interference from transmission points #2 and 3 can be measured with high accuracy in resources where muting is set. Now, since randomization is executed separately at each transmission point, cases might occur where, between a plurality of transmission points, part of the resource blocks have overlapping muting patterns. However, even when the muting pattern overlaps in part of the resource blocks, if the muting pattern does not overlap in the majority of the resource blocks, the accuracy of interference measurement can be improved by averaging the interference measurement result.

Note that, although FIG. 4 shows a configuration to apply different muting patterns on a per resource block basis, this configuration is by no means limiting. It is equally possible to apply different muting patterns on a per resource block group basis, where a resource block group is formed with a plurality of resource blocks.

Figure 5:
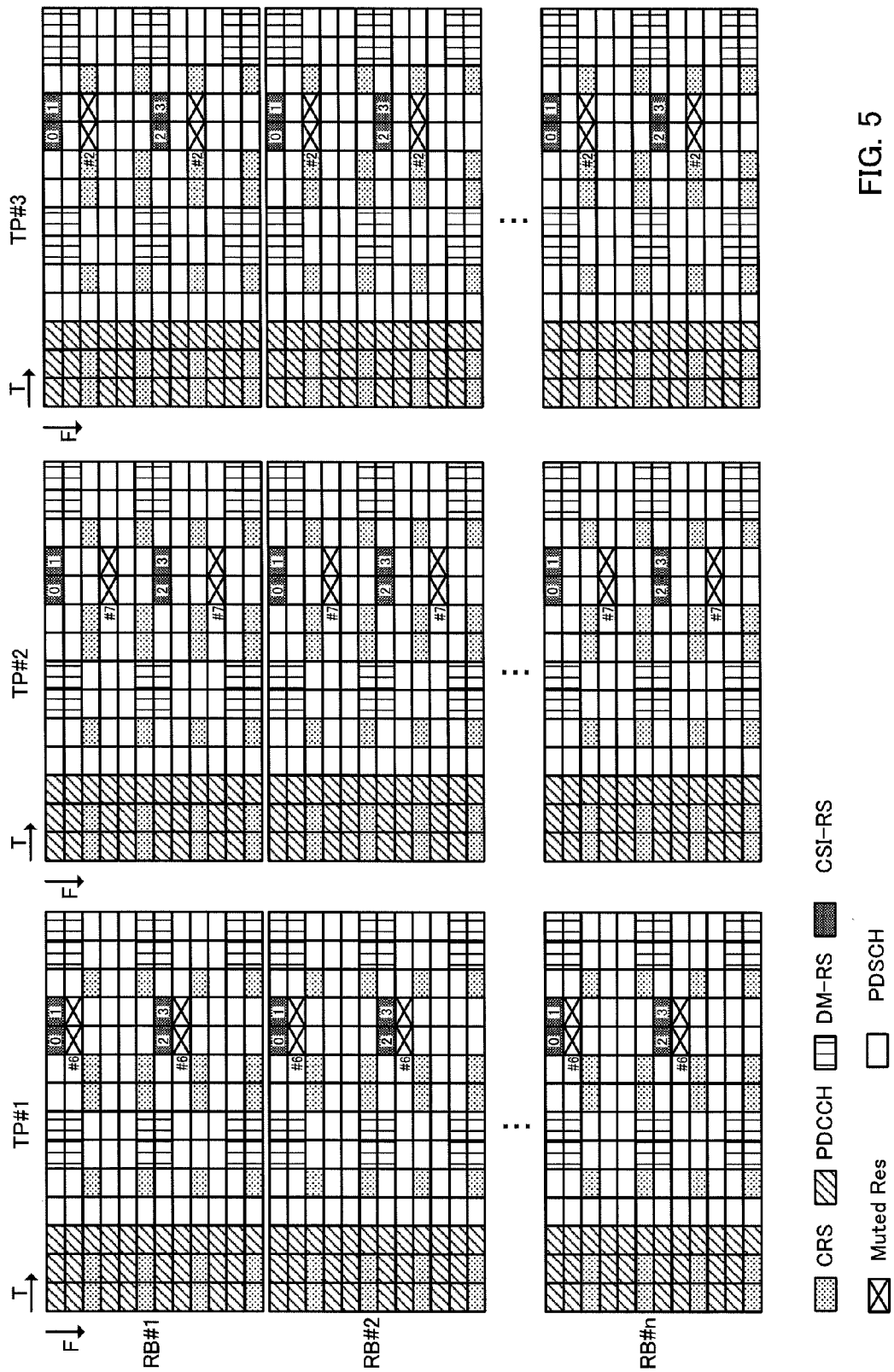
FIG. 5 is a diagram to show another example of a method of setting muting.

Also, as shown in FIG. 5, a configuration in which, at each transmission point, the positions to set muting are made the same between all resource blocks, and in which, between a plurality of transmission points, the positions to set muting are hopped, may be possible as well. By this means, it is possible to reduce the overlap of muting patterns between transmission points with a simple configuration, so that the accuracy of interference measurement is improved by the averaging the interference measurement result.

Figure 6:
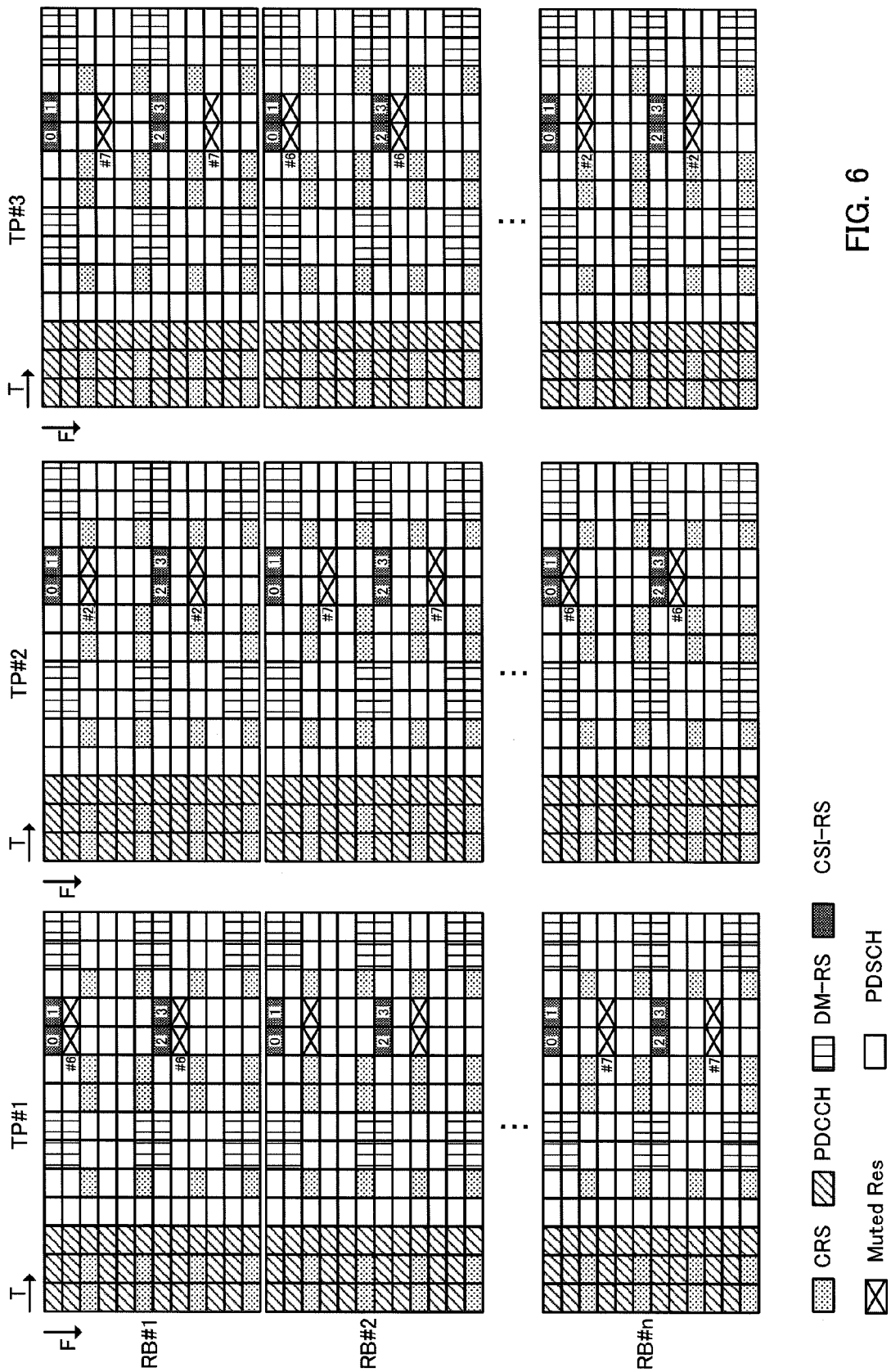
FIG. 6 is a diagram to show another example of a method of setting muting.

Note that, in the configurations shown in FIG. 4 and FIG. 5, it is difficult to minimize the overlap of muting patterns. In this case, as shown in FIG. 6, it is possible to hop the positions to set muting between resource blocks at each transmission point, and also hop the position to set muting between a plurality of transmission points. By this means, the overlap of muting patterns between transmission points is minimized, and the accuracy of interference measurement is improved by averaging the interference measurement result.

The positions to set muting determined in this way are reported from a base station apparatus to a mobile terminal apparatus. This is to allow the mobile terminal apparatus to identify the resources to measure interference with, and, besides, to allow the base station apparatus to perform user data rate matching by avoiding muted resources. Unless the mobile terminal apparatus identifies the muted resources and performs rate matching, the demodulation process is applied to muted resources as well, and therefore the throughput of the demodulation process and the accuracy of demodulation are damaged.

Now, the first method of reporting muting according to the present embodiment will be described with reference to FIG. 7. FIG. 7 provides diagrams, each showing an example of the first muting reporting method. Note that FIG. 7 shows examples of reporting muting to mobile terminal apparatuses having four transmission ports.

Figure 7A:
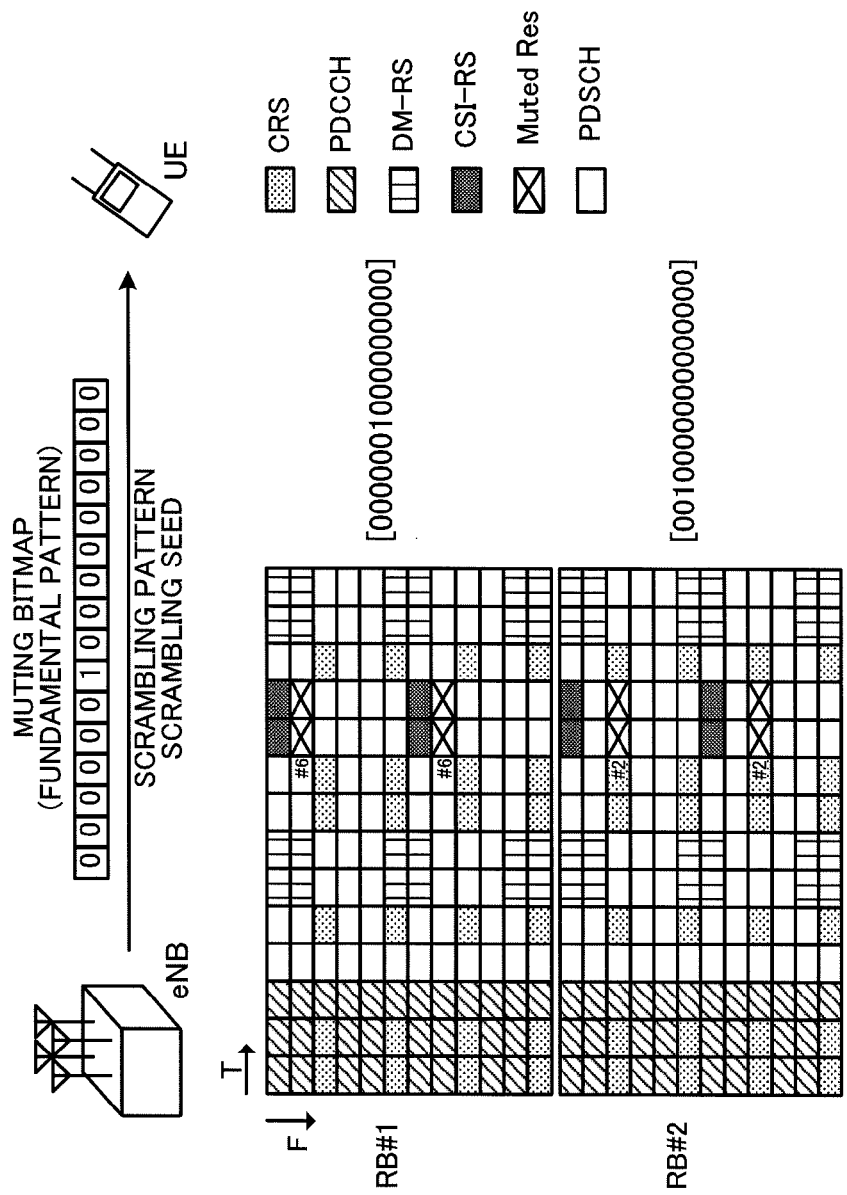
FIG. 7 provides diagrams each showing an example of a first muting reporting method.

The first reporting method shown in FIG. 7A is a method of reporting a fundamental pattern of muting, and randomizing information that randomizes the fundamental pattern on a per resource block basis. Note that FIG. 7A shows a configuration in which the positions to set muting (hopping pattern) are determined separately at a plurality of transmission points, and in which the positions to set muting hop between resource blocks at each transmission point. The base station apparatus is able to determine muting patterns on a per resource block basis, based on the fundamental muting pattern and randomizing information that randomizes the fundamental pattern on a per resource block basis. The base station apparatus reports the fundamental muting pattern to a mobile terminal apparatus in a bitmap format, in which the indices with which the CSI-RS patterns are numbered, and whether or not muting is applied, are associated with each other on a one-by-one basis. The fundamental pattern may be referred to as a non-random pattern.

In this case, in association with indices [#0 to #9 and #20 to #25] (CSI Configurations=0 to 9 and 20 to 25), in which TDD additional patterns are added to the FDD normal patterns shown in FIG. 1, 16-bit bitmap information is reported. For example, when muting is set in the CSI-RS resources designated by index #6, bitmap information [0000001000000000] is reported as the fundamental pattern. In the bitmap information, "1" is set in the resources to be muted, and "0" is set in the resources that are not muted.

The base station apparatus reports a scrambling pattern and a scrambling seed (initial value) to a mobile terminal apparatus as randomizing information. The mobile terminal apparatus uses the scrambling seed as an initial value and scrambles the fundamental pattern of bitmap format using the scrambling pattern. By this means, the mobile terminal apparatus specifies the muting patterns that are applied on a per resource block basis in the base station apparatus.

For example, upon receiving the fundamental pattern and randomizing information from the base station apparatus, the mobile terminal apparatus specifies the muting pattern of resource block #1 from the fundamental pattern. That is, based on the bit map information [0000001000000000], which serves as the fundamental pattern, the mobile terminal apparatus specifies the CSI-RS resources designated by index #6. Also, the mobile terminal apparatus specifies the muting pattern of resource block #2 based on the fundamental pattern and randomizing information. For example, the mobile terminal apparatus specifies the CSI-RS resources designated by index #2 based on [0010000000000000], which is given by randomizing the bit map information [0000001000000000] of the fundamental pattern. The mobile terminal apparatus likewise specifies the muting patterns with respect to the rest of the resource blocks, based on the fundamental pattern and randomizing information. Note that, as for resource block #1, it is possible not to apply the fundamental pattern and instead apply a muting pattern that is given by randomizing the fundamental pattern.

By means of this configuration, it is possible to reduce the amount of signaling upon reporting muting patterns. The fundamental pattern and randomizing information are reported through higher layer signaling (for example, RRC signaling).

Note that, although the present embodiment assumes a configuration to report a fundamental pattern and randomizing information, this configuration is by no means limiting. If a fundamental pattern is set in a mobile terminal apparatus in advance, it is possible to report randomizing information alone. Also, although the present embodiment assumes a configuration to report a scrambling pattern and a scrambling seed as randomizing information, this configuration is by no means limiting. If a scrambling pattern is set in a mobile terminal apparatus in advance, it is possible to report a scrambling seed alone.

Also, as long as randomizing information allows a fundamental pattern to be randomized, for example, an interleaving pattern shifting pattern and an interleaving seed shifting seed may be used as well. Also, besides the fundamental pattern and randomizing information, the base station apparatus reports the transmission period (duty cycle) and subframe offset to a mobile terminal apparatus.

Figure 7B:
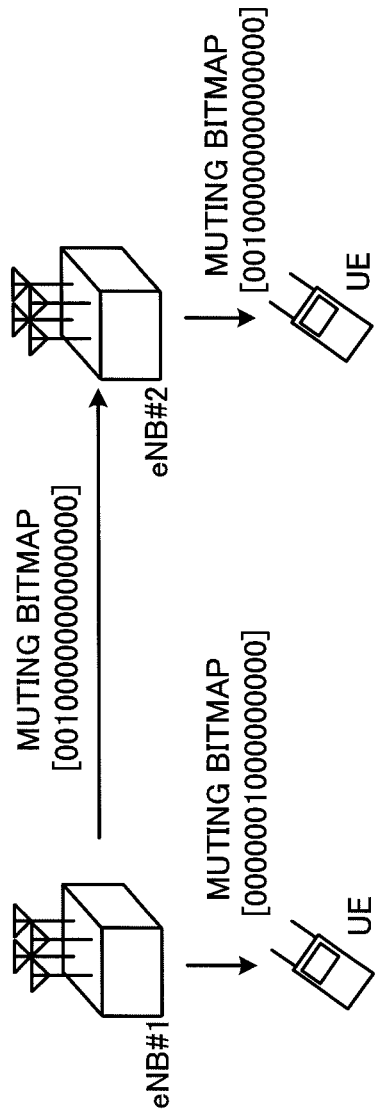

The first reporting method can be used with a configuration to hop the positions to set muting only between a plurality of transmission points. As shown in FIG. 7B, one base station apparatus (for example, macro) generates a plurality of muting patterns by randomizing a fundamental pattern based on randomizing information. The one base station apparatus reports separate muting patterns to other base station apparatuses (for example, pico) located at each transmission point. The base station apparatus at each transmission point applies the reported muting pattern to all resource blocks uniformly.

The base station apparatus at each transmission point reports the applied muting pattern to mobile terminal apparatuses connected to that transmission point, in a bit map format. This reporting of a muting pattern is performed, for example, through higher layer signaling (for example, RRC signaling). By means of this configuration, a mobile terminal apparatus specifies the muting pattern that is applied to the base station apparatus. Also, communication between transmission points may be made possible by wired communication or by wireless communication.

Figure 7C:
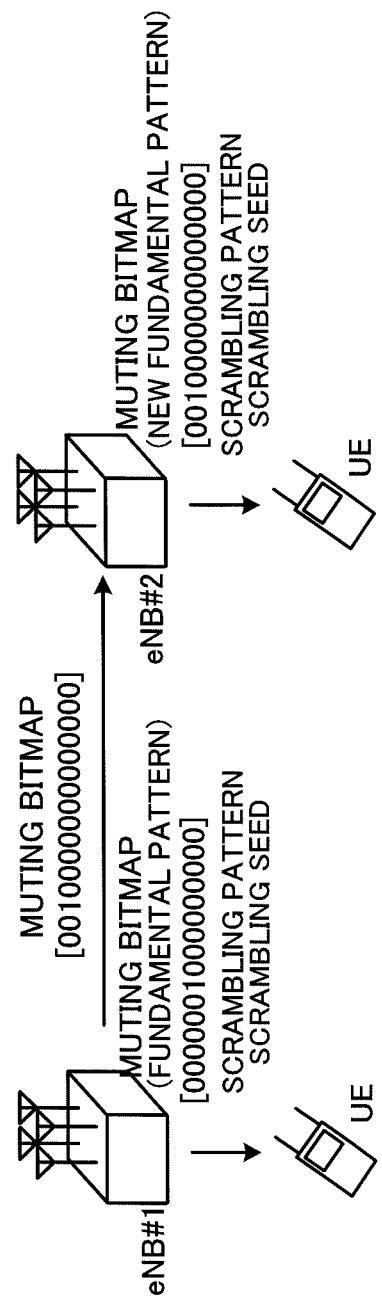

The first reporting method can be used with a configuration to hop the position to set muting between a plurality of resource blocks and between a plurality of transmission points. As shown in FIG. 7C, one base station apparatus (for example, macro) generates a plurality of muting patterns by randomizing a fundamental pattern based on randomizing information. The one base station apparatus reports separate muting patterns to other base station apparatuses (for example, pico) located at each transmission point. The base station apparatus at each transmission point uses the reported muting pattern as a new fundamental pattern. Then, base station apparatuses at the other transmission points randomize the new fundamental pattern and determine muting patterns on a per resource block basis.

The base station apparatus at each transmission point reports the new fundamental pattern and randomizing information to mobile terminal apparatuses connected to that transmission point. This reporting of a new fundamental pattern and randomizing information is performed, for example, through higher layer signaling (for example, RRC signaling). With this configuration, a mobile terminal apparatus specifies the muting pattern applied to the base station apparatus on a per resource block basis. Also, communication between transmission points may be made possible by wired communication or by wireless communication.

Next, the second muting reporting method according to the present embodiment will be described with reference to FIG. 8. FIG. 8 provides diagrams each showing an example of a second muting reporting method. Note that FIG. 8 shows examples of reporting muting to mobile terminal apparatuses having four transmission ports.

Figure 8A:
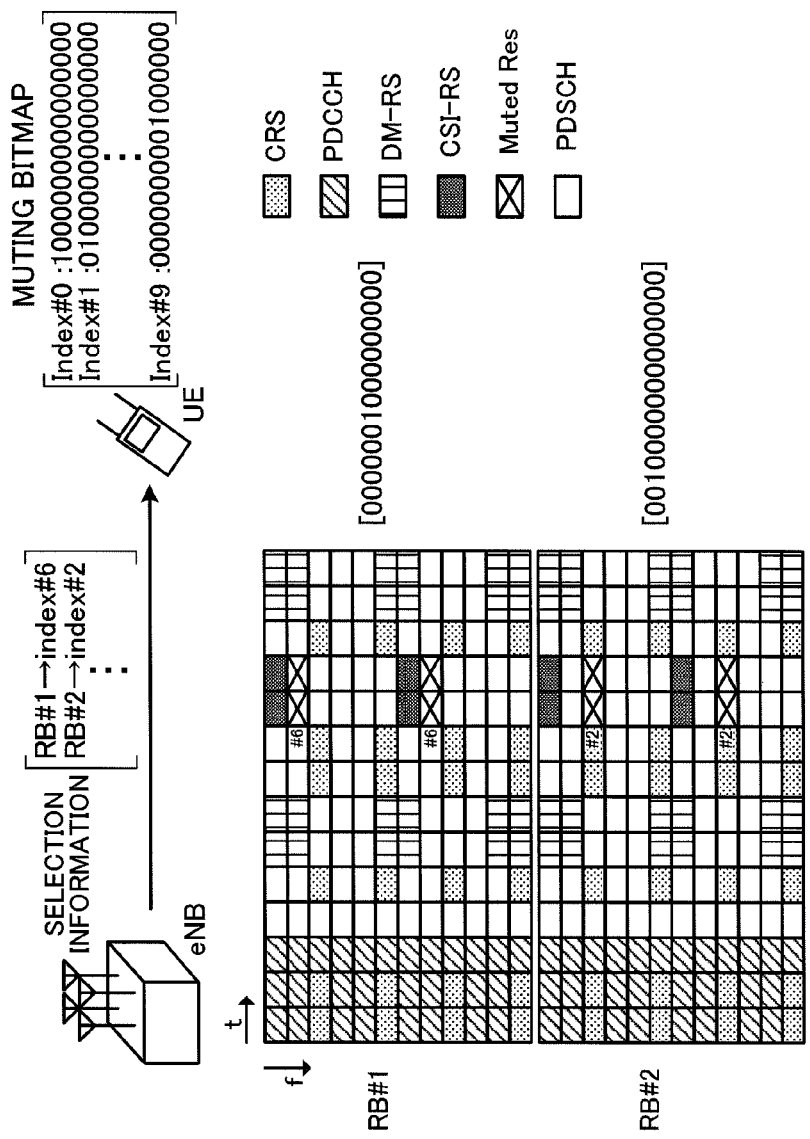
FIG. 8 provides diagrams each showing an example of a second muting reporting method.

The second reporting method shown in FIG. 8A is a method of reporting a plurality of muting patterns to a mobile terminal apparatus in advance, and then separately reporting selection information that allows the mobile terminal apparatus to select muting patterns on a per resource block basis, to the mobile terminal apparatus. Note that FIG. 8A shows a configuration in which the positions to set muting (hopping pattern) are determined separately at a plurality of transmission points, and in which, at each transmission point, the positions to set muting are hopped between resource blocks. The base station apparatus determines muting patterns on a per resource block basis, based on the selection information. The base station apparatus reports a plurality of muting patterns to a mobile terminal apparatus, in advance, in the above-described bitmap format.

For example, ten types of muting patterns #0 to #9 are reported to a mobile terminal apparatus as candidate muting patterns. Muting patterns #0 to #9 are muting patterns in which the CSI-RS resources designated by indices #0 to #9 are muted. Note that the time to report the muting patterns is not particularly limited. The muting patterns may be reported from the base station apparatus to a mobile terminal apparatus when the mobile terminal apparatus is activated, when communication is started, and so on. Also, the muting patterns may be set in advance in the mobile terminal apparatus.

The base station apparatus reports, to the mobile terminal apparatus, selection information that allows the mobile terminal apparatus to select the muting patterns allocated on a per resource block basis, from ten types of muting patterns #0 to #9. By receiving the selection information, the mobile terminal apparatus specifies the muting pattern applied to each resource block from ten types of muting patterns #0 to

9. The selection information has only to be information that has certain rules to show which muting patterns apply.

For example, based on the selection information, the mobile terminal apparatus selects muting pattern #6 with respect to resource block #1 and selects muting pattern #2 with respect to resource block #2. The mobile terminal apparatus specifies the CSI-RS resources designated by index #6 based on bitmap information [0000001000000000], which is muting pattern #6. Also, based on bitmap information [0010000000000000], which is muting pattern #2, the mobile terminal apparatus specifies the CSI-RS resources designated by index #2. With respect to the rest of the resource blocks, the mobile terminal apparatus specifies the muting patterns in the same way, based on selection information.

By means of this configuration, it is possible to reduce the amount of signaling upon reporting muting patterns. Muting patterns and selection information are reported, for example, through higher layer signaling (for example, RRC signaling). Also, besides muting patterns and selection information, the base station apparatus reports the transmission period (duty cycle) and subframe offset to a mobile terminal apparatus.

Figure 8B:
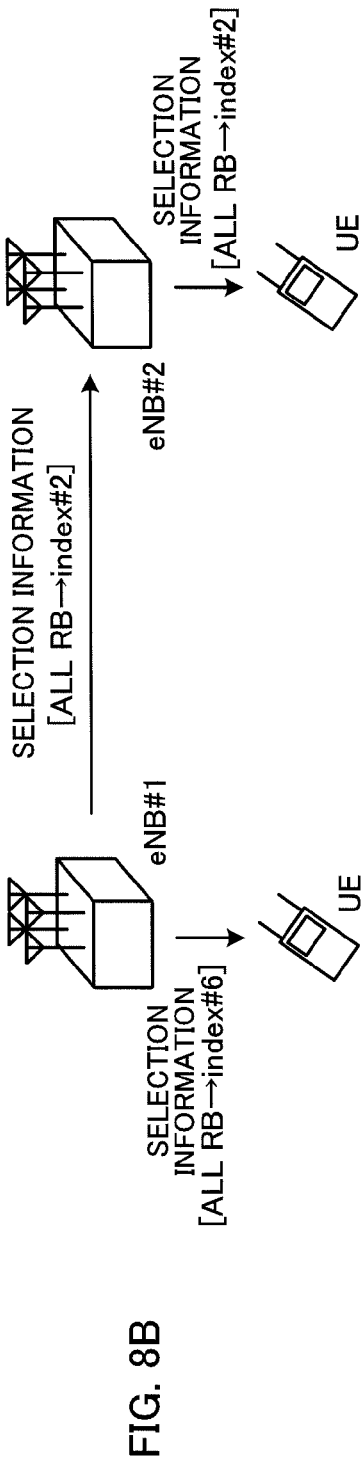

The second reporting method can be used with a configuration to hop the position to set muting only between a plurality of transmission points. As shown in FIG. 8B, one base station apparatus (for example, macro) selects one muting pattern based on selection information. The one base station apparatus reports, to other base station apparatuses (for example, pico) at each transmission point, selection information that is separate from that of the one base station apparatus. The base station apparatus at each transmission point determines one muting pattern based on the reported selection information, and applies this muting pattern to all resource blocks uniformly.

The base station apparatus at each transmission point reports selection information to mobile terminal apparatuses connected to that transmission point. This reporting of selection information is performed, for example, through higher layer signaling (for example, RRC signaling). With this configuration, a mobile terminal apparatus specifies the muting patterns applied to the resource blocks of the base station apparatus. Also, communication between transmission points may be made possible by wired communication or by wireless communication.

Figure 8C:
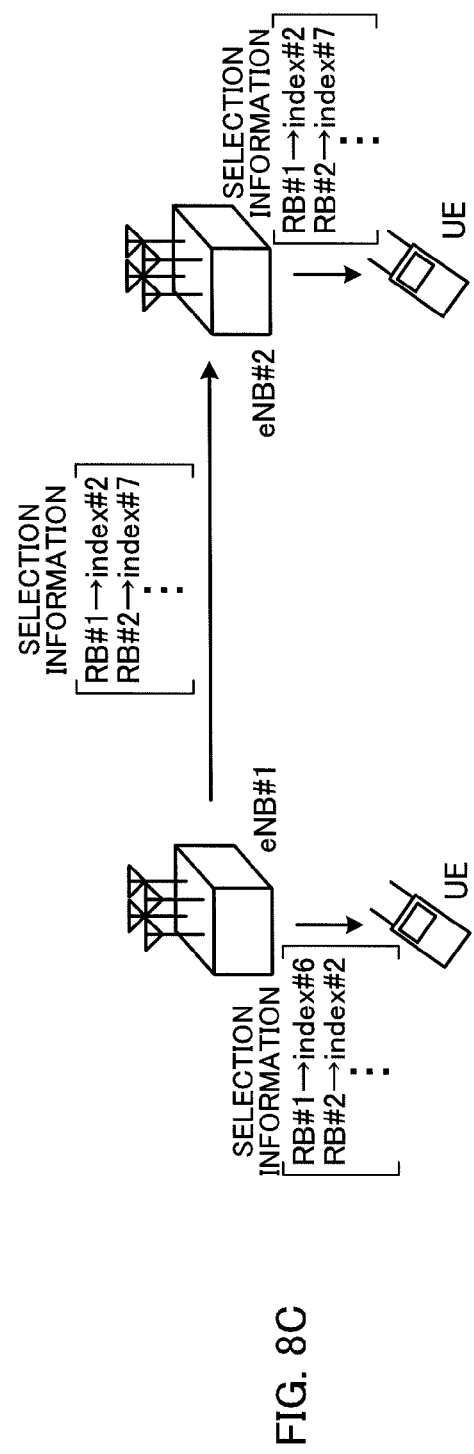

The second reporting method can be used with a configuration to hop the positions to set muting between a plurality of resource blocks and between a plurality of transmission points. As shown in FIG. 8C, one base station apparatus (for example, macro) determines muting patterns on a per resource block basis based on selection information. The one base station apparatus reports, to other base station apparatuses (for example, pico) at each transmission point, selection information that is separate from that of the one base station apparatus. The base station apparatus at each transmission point determines muting patterns on a per resource block basis, based on the reported selection information.

The base station apparatus at each transmission point reports selection information to mobile terminal apparatuses connected to that transmission point. The selection information is reported through higher layer signaling (for example, RRC signaling). With this configuration, a mobile terminal apparatus specifies the muting patterns of the base station apparatus applied on a per resource block basis. Also, communication between transmission points may be made possible by wired communication or by wireless communication.

Note that, although the present embodiment assumes a configuration to set muting every four transmission ports, this configuration is by no means limiting. For example, muting may be set every two transmission ports. Also, the above-described muting patterns are by no means limiting, and new muting patterns may be defined as well.

Also, the method of reporting muting is by no means limited to the first and second reporting methods. Any method may be used as long as muting patterns can be reported. For example, it is possible to report muting patterns in a bitmap format on a per resource block basis or on a per resource block group basis.

Figure 9:
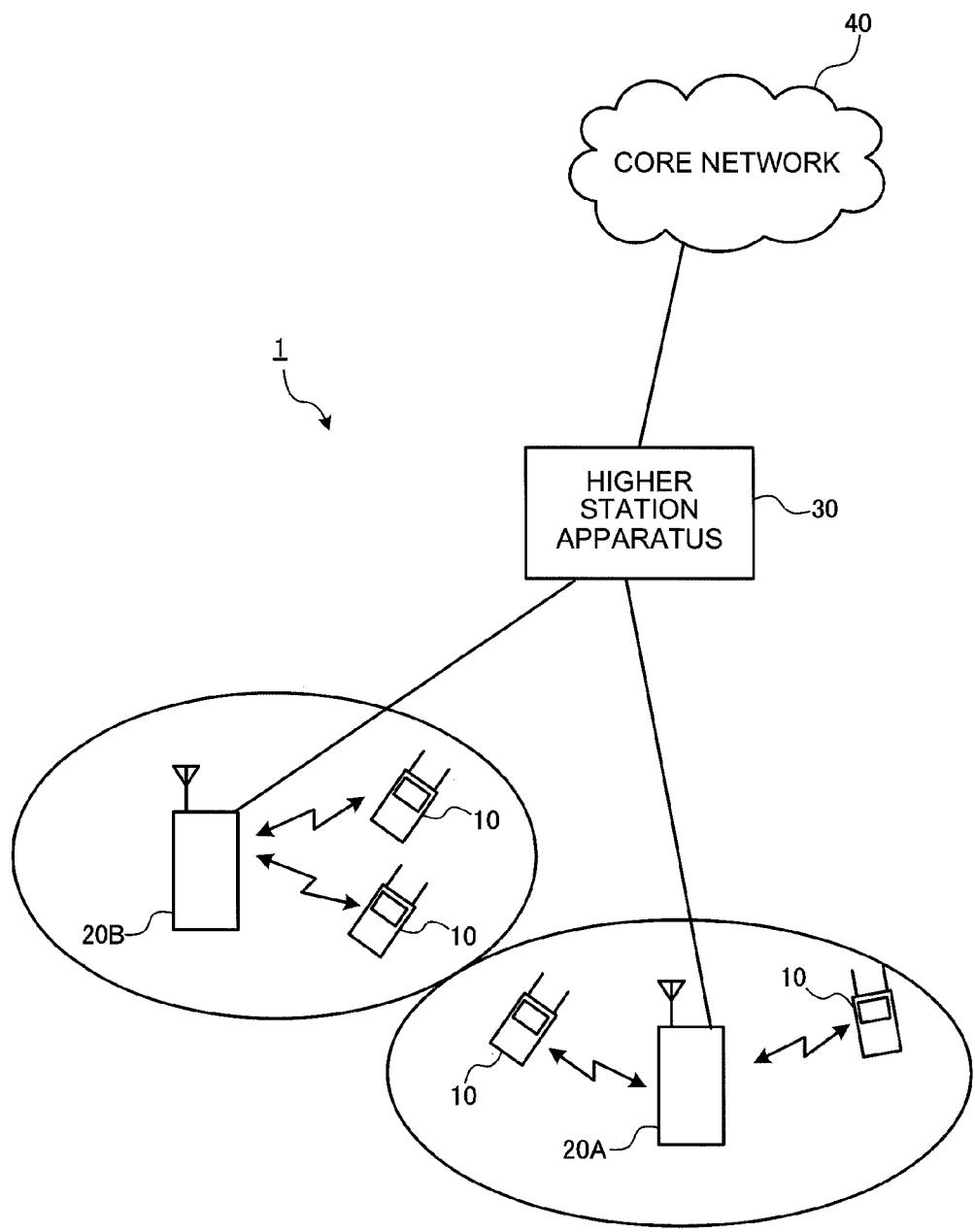
FIG. 9 is a diagram to explain a system configuration of a radio communication system.

Now, a radio communication system according to an embodiment of the present invention will be described in detail. FIG. 9 is a diagram to explain a system configuration of a radio communication system according to the present embodiment. Note that the radio communication system shown in FIG. 9 is a system to accommodate, for example, the LTE system or SUPER 3G. In this radio communication system, carrier aggregation, which groups a plurality of fundamental frequency blocks into one, where the system band of the LTE system is one unit, is used. Also, this radio communication system may be referred to as IMT-Advanced or may be referred to as 4G.

As shown in FIG. 9, a radio communication system 1 is configured to include base station apparatuses 20A and 20B at each transmission point, and mobile terminal apparatuses 10 that communicate with the radio base station apparatuses 20A and 20B. The base station apparatuses 20A and 20B are connected with a higher station apparatus 30, and this higher station apparatus 30 is connected with a core network 40. Also, the base station apparatuses 20A and 20B are connected with each other by wire connection or by wireless connection. The mobile terminal apparatuses 10 are able to communicate with the base station apparatuses 20A and 20B at transmission points #1 and #2. Note that the higher station apparatus 30 is, for example, an access gateway apparatus, a radio network controller (RNC), a mobility management entity (MME) and so on, but is by no means limited to these.

Although the mobile terminal apparatuses 10 may include LTE terminals as well as LTE-A terminals, simply mobile terminal apparatuses will be described, unless specified otherwise. Also, although the following description will assume, for ease of explanation, that the mobile terminal apparatuses 10 perform radio communication with the base station apparatuses 20A and 20B, more generally, user apparatuses (UE: User Equipment) to include both mobile terminal apparatuses and fixed terminal apparatuses may be used as well.

As for radio access schemes, in the radio communication system 1, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels will be described. Downlink communication channels include a PDSCH (Physical Downlink Shared Channel), which is a downlink data channel used by each mobile terminal apparatus 10 on a shared basis, and downlink L1/L2 control channels (PDCCH, PCFICH, PHICH). Transmission data and higher control information are transmitted by the PDSCH. Scheduling information for the PDSCH and the PUSCH and so on are transmitted by the PDCCH (Physical Downlink Control Channel). The number of OFDM symbols to use for the PDCCH is transmitted by the PCFICH (Physical Control Format Indicator Channel). HARQ ACK/NACK for the PUSCH is transmitted by the PHICH (Physical Hybrid-ARQ Indicator Channel).

Uplink communication channels include a PUSCH (Physical Uplink Shared Channel), which is an uplink data channel used by each mobile terminal apparatus on a shared basis, and a PUCCH (Physical Uplink Control Channel), which is an uplink control channel. Transmission data and higher control information are transmitted by means of this PUSCH. Also, by means of the PUCCH, downlink radio quality information (CQI: Channel Quality Indicator), ACK/NACK and so on are transmitted.

Figure 10:
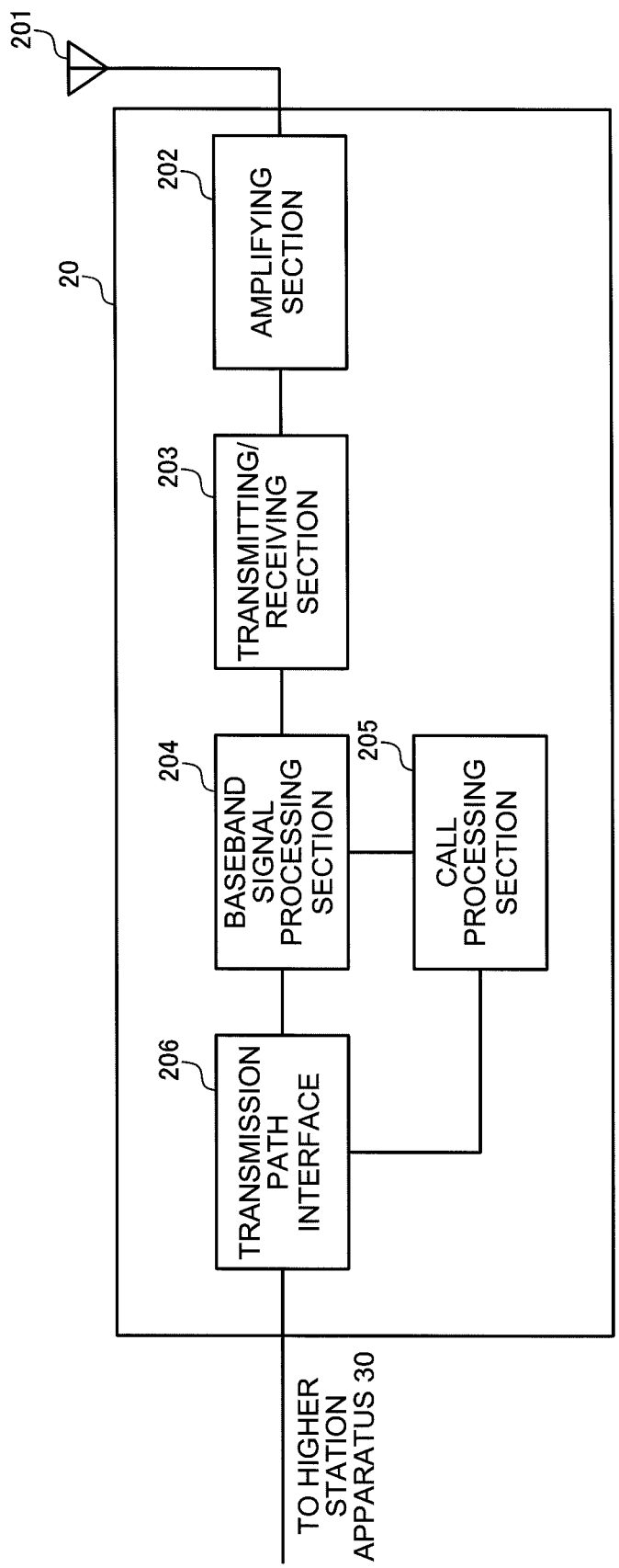
FIG. 10 is a diagram to explain an overall configuration of a base station apparatus.

An overall configuration of a base station apparatus according to the present embodiment will be described with reference to FIG. 10. Note that the base station apparatuses 20A and 20B have the same configuration and therefore will be described as "base station apparatus 20." The base station apparatus 20 has a transmitting/receiving antenna 201, an amplifying section 202, a transmitting/receiving section 203, a baseband signal processing section 204, a call processing section 205, and a transmission path interface 206. Transmission data to be transmitted from the base station apparatus 20 to a mobile terminal apparatus on the downlink is input from the higher station apparatus 30 into the baseband signal processing section 204, via the transmission path interface 206.

In the baseband signal processing section 204, a signal of the downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of the physical downlink control channel, which is downlink control channel, is also subjected to transmission processes such as channel coding and an inverse fast Fourier transform.

Also, the baseband signal processing section 204 reports control information for allowing each mobile terminal apparatus 10 to perform radio communication with the base station apparatus 20, to the mobile terminal apparatuses 10 connected to the same transmission point, through a broadcast channel. The information for communication at the transmission points includes, for example, the uplink or downlink system bandwidth, root sequence identification information (root sequence index) for generating random access preamble signals in the PRACH, and so on.

The transmitting/receiving section 203 converts a baseband signal that is output from the baseband signal processing section 204 into a radio frequency band. The amplifying section 202 amplifies the radio frequency signal having been subjected to frequency conversion, and outputs the result to the transmitting/receiving antenna 201.

Meanwhile, as for signals to be transmitted from the mobile terminal apparatus 10 to the base station apparatus 20 on the uplink, a radio frequency signal received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT process, an IDFT process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processing such as setting up and releasing communication channels, manages the state of the base station apparatus 20 and manages the radio resources.

Next, an overall configuration of a mobile terminal apparatus according to the present embodiment will be described with reference to FIG. 11. A mobile terminal apparatus 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. The baseband signal that is output from the baseband signal processing section 104 is converted into a radio frequency band in the transmitting/receiving section 103. After that, the radio frequency signal having been subjected to frequency conversion is amplified in the amplifying section 102, and transmitted from the transmitting/receiving antenna 101.

Figure 12:
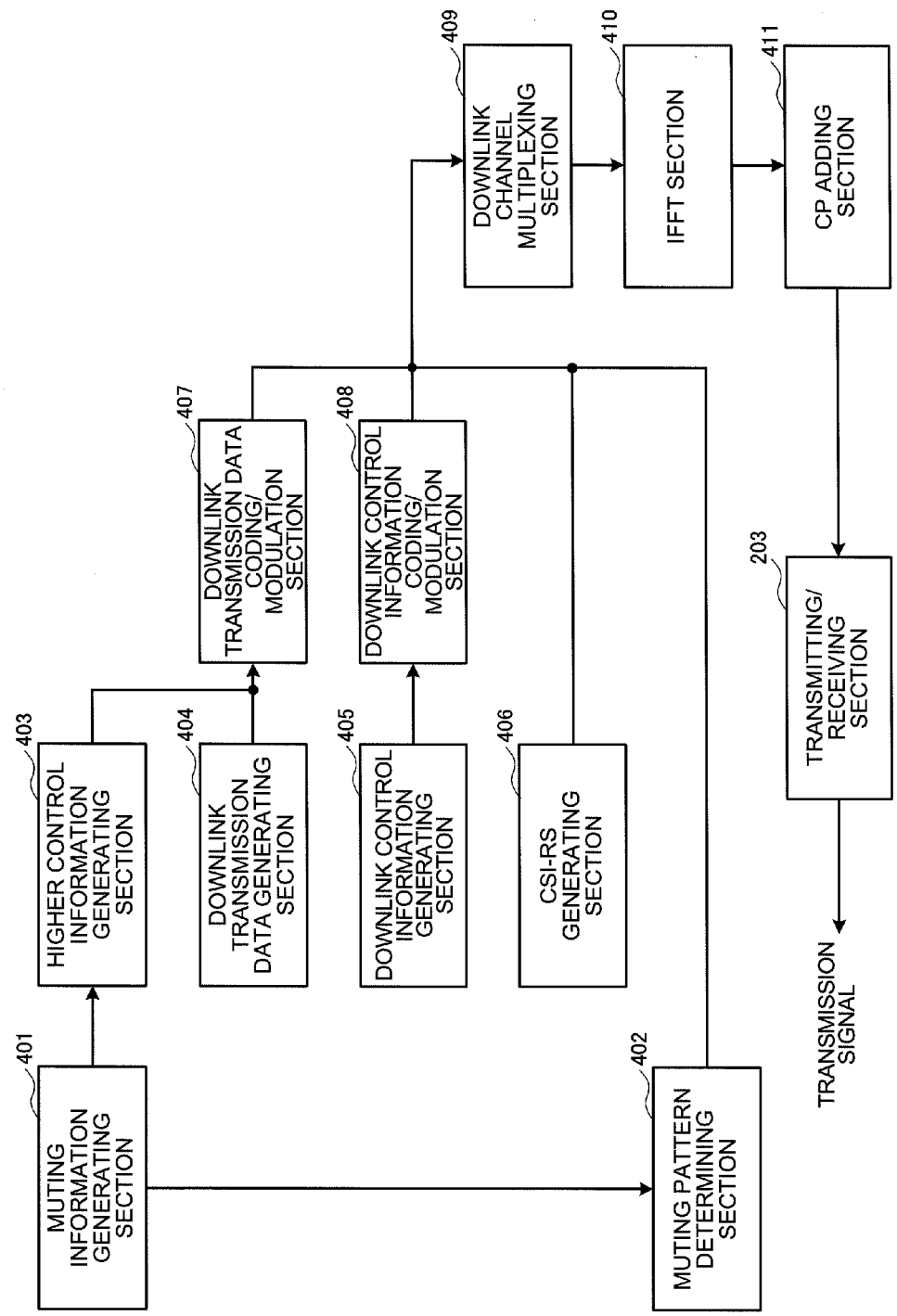
FIG. 12 is a functional block diagram of a base station apparatus corresponding to a muting pattern determining process.

Functions blocks of the base station apparatus corresponding to the muting pattern determining process will be described with reference to FIG. 12. Note that each function block of FIG. 12 primarily relates to the baseband processing section shown in FIG. 10. Also, the function blocks of FIG. 12 are simplified to explain the present invention, and assumed to have configurations which a baseband processing section should normally have. Note that, in FIG. 12, a configuration in which the positions to set muting (hopping pattern) are determined separately at a plurality of transmission points and the positions to set muting are hopped between resource blocks at each transmission point, will be described as an example.

The base station apparatus 20 has, on the transmitting side, a muting information generating section 401, a muting pattern determining section 402, a higher control information generating section 403, a downlink transmission data generating section 404, a downlink control information generating section 405, a CSI-RS generating section 406, a downlink transmission data coding/modulation section 407, and a downlink control information coding/modulation section 408. Also, the base station apparatus 20 has a downlink channel multiplexing section 409, an IFFT section 410 and a CP adding section 411.

The muting information generating section 401 determines the unit of randomization (which may be carried out, for example, in resource block units or in resource block group units), and generates muting information including a fundamental pattern, randomizing information, selection information and so on. The muting information generating section 401 outputs the muting information to the muting pattern determining section 402 and the higher control information generating section 403.

The muting pattern determining section 402 determines the muting pattern based on the muting information. When the first reporting method shown in FIG. 7A is applied, the muting pattern determining section 402 randomizes the fundamental pattern based on the randomizing information, and determines the muting pattern on a per resource block basis. Also, when the second reporting method shown in FIG. 8A is applied, the muting pattern is determined from a plurality of muting patterns, based on the selection information, on a per resource block basis.

The higher control information generating section 403 generates higher control information to be transmitted and received through higher layer signaling (for example, RRC signaling), and outputs the generated higher control information to the downlink transmission data coding/modulation section 407. To be more specific, the higher control information generating section 403 generates higher control information that includes the muting information output from the muting information generating section 401. The downlink transmission data generating section 404 generates downlink transmission data, and outputs that downlink transmission data to the downlink transmission data coding/modulation section 407.

The downlink control information generating section 405 generates downlink control information, and outputs that downlink control information to the downlink control information coding/modulation section 408. The downlink transmission data coding/modulation section 407 performs channel coding and data modulation of the downlink transmission data and the higher control information, and outputs the results to the downlink channel multiplexing section 409. The downlink control information coding/modulation section 408 performs channel coding and data modulation of the downlink control information, and outputs the result to the downlink channel multiplexing section 409. The CSI-RS generating section 406 generates a CSI-RS and outputs that CSI-RS to the downlink channel multiplexing section 409.

The downlink channel multiplexing section 409 combines the downlink control information, the CSI-RS, the higher control information and the downlink transmission data, and generates a transmission signal. In this case, the downlink channel multiplexing section 409 multiplexes the downlink transmission data in a way to avoid the positions to set muting determined in the muting pattern determining section 402. The downlink channel multiplexing section 409 outputs the generated transmission signal to the IFFT section 410. The IFFT section 410 applies an inverse fast Fourier transform to the transmission signal and converts the transmission signal from a frequency domain signal to a time domain signal. The transmission signal after the IFFT is output to the CP adding section 411. The CP adding section 411 adds CPs (Cyclic Prefixes) to the transmission signal after the IFFT, and outputs the transmission signal, to which CPs have been added, to the amplifying section 202 shown in FIG. 10, through the transmitting/receiving section 203.

Figure 13:
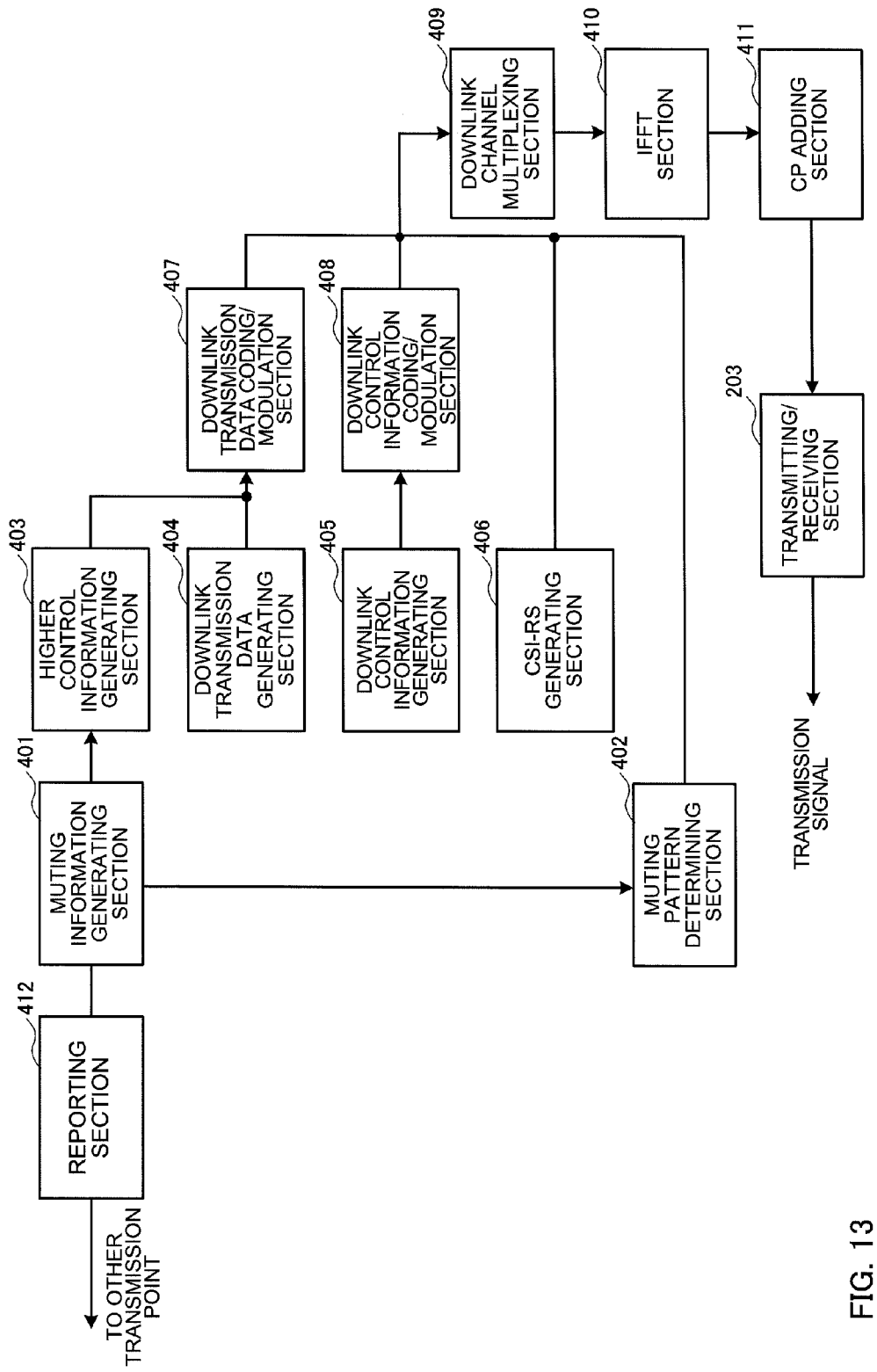
FIG. 13 is another functional block diagram of a base station apparatus corresponding to a muting pattern determining process.

Note that, as shown in FIG. 5 and FIG. 6, the muting information generating section 401 may also hop the positions to set muting between a plurality of transmission points. The function blocks of the base station apparatus in this case are shown in FIG. 13. Note that function blocks in FIG. 13 that are the same as in FIG. 12 will be assigned the same reference codes as in FIG. 12, and redundant explanations regarding these parts will be omitted.

As shown in FIG. 13, the muting information generating section 401 may or may not report muting information to the muting information generating section 401 of other transmission points. When muting information is to be reported to other transmission points and the first reporting method is to be applied, the muting information generating section 401 outputs one muting pattern that is generated by randomizing a fundamental pattern, to a reporting section 412 for other transmission points. The reporting section 412 for other transmission points reports the muting pattern to the muting information generating sections 401 of other transmission points. The muting pattern determining sections 402 of other transmission points may apply the reported muting pattern to all resource blocks uniformly, as shown in FIG. 7B. Also, as shown in FIG. 7C, the muting pattern determining sections 402 of other transmission points may randomize the reported muting pattern as a new fundamental pattern, and determine muting patterns on a per resource block basis.

When muting information is to be reported to other transmission points and the second reporting method is to be applied, the muting information generating section 401 outputs selection information to the reporting section 412 for other transmission points. The reporting section 412 for other transmission points reports the selection information to the muting information generating sections 401 of other transmission points. As shown in FIG. 8B, the muting pattern determining sections 402 of other transmission points may select one muting pattern from a plurality of muting patterns in accordance with the selection information that has been reported, and apply this pattern to all resource blocks uniformly. Also, as shown in FIG. 8C, the muting pattern determining sections 402 of other transmission points may select muting patterns separately, on a per resource block basis, from a plurality of muting patterns, in accordance with the selection information that has been reported.

Figure 14:
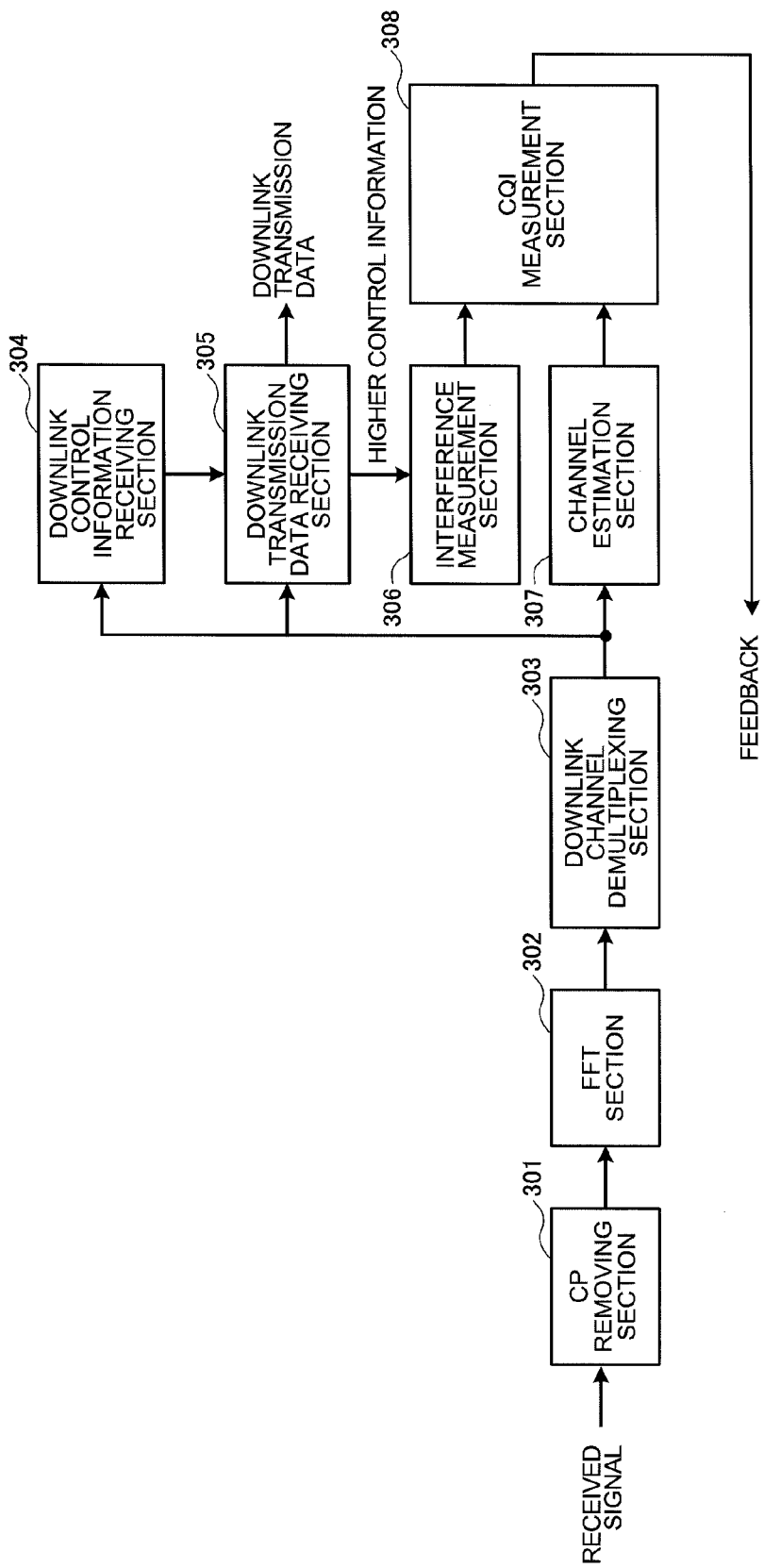
FIG. 14 is a functional block diagram of a mobile terminal apparatus corresponding to an interference measurement process.

Function blocks of the mobile terminal apparatus corresponding to the interference measurement process will be described with reference to FIG. 14. Note that each function block of FIG. 14 primarily relates to the baseband processing section 104 shown in FIG. 11. Also, the function blocks of FIG. 14 are simplified to explain the present invention, and assumed to have configurations in which a baseband processing section should normally have.

The mobile terminal apparatus 10 has, on the receiving side, a CP removing section 301, an FFT section 302, a downlink channel demultiplexing section 303, a downlink control information receiving section 304, a downlink transmission data receiving section 305, an interference measurement section 306, a channel estimation section 307, and a CQI measurement section 308.

Figure 11:
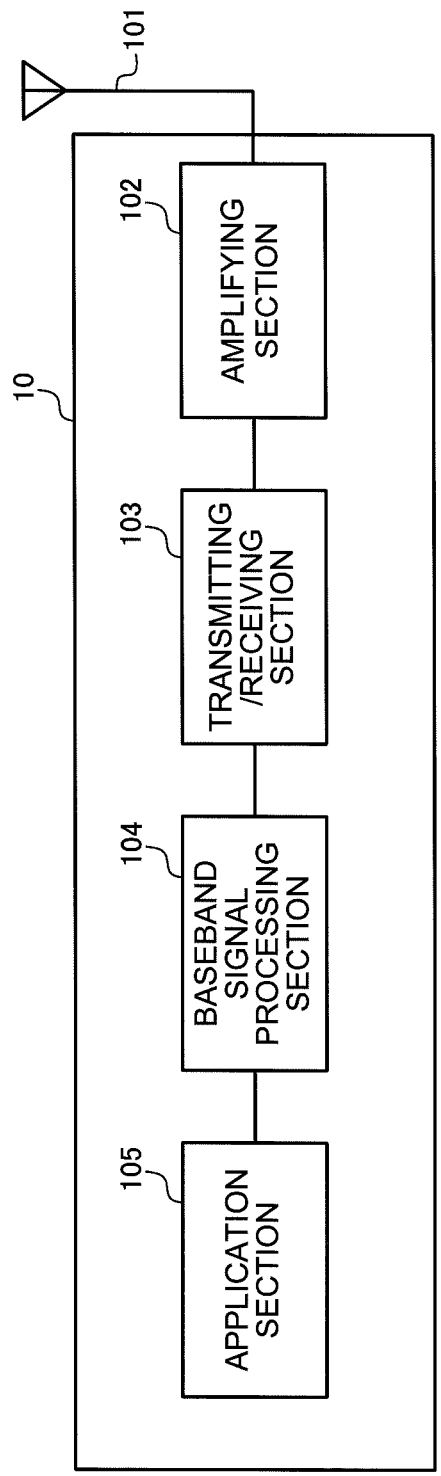
FIG. 11 is a diagram to explain an overall configuration of a mobile terminal apparatus.

A transmission signal that is transmitted from the base station apparatus 20 is received in the transmitting/receiving antenna 101 shown in FIG. 11, and output to the CP removing section 301. The CP removing section 301 removes the CPs from the received signal and outputs the result to the FFT section 302. The FFT section 302 applies a fast Fourier transform (FFT) to the signal, from which the CPs have been removed, and converts the signal from a time domain signal to a frequency domain signal. The FFT section 302 outputs the converted frequency domain signal to the downlink channel demultiplexing section 303.

The downlink channel demultiplexing section 303 demultiplexes the downlink channel signal into downlink control information, downlink transmission data, and CSI-RS. The downlink channel demultiplexing section 303 outputs the downlink control information to the downlink control information receiving section 304, outputs the downlink transmission data and the higher control information to the downlink transmission data receiving section 305, and outputs the CSI-RS to the channel estimation section 307.

The downlink control information receiving section 304 demodulates the downlink control information, and outputs the demodulated downlink control information to the downlink transmission data receiving section 305. The downlink transmission data receiving section 305 demodulates the downlink transmission data using the demodulated downlink control information. At this time, the downlink transmission data receiving section 305 specifies the positions to set muting based on the muting information included in the higher control information. The downlink transmission data receiving section 305 disregards the positions to set muting with the CSI-RS, and demodulates the user data. Also, the downlink transmission data receiving section 305 outputs the higher control information included in the downlink transmission data to the interference measurement section 306.

The interference measurement section 306 specifies the positions to set muting based on the muting information included in the higher control information. For example, in the event of the first reporting method, the muting pattern that is determined by randomizing a fundamental pattern based on randomizing information and applied to each resource block is specified. In the event of the second reporting method, muting patterns are selected from a plurality of muting patterns that are reported in advance, based on selection information, and specified on a per resource block basis. The interference measurement section 306 measures interference at the positions where muting is set, and averages the measurement results over all resource blocks.

In this case, the muting patterns are randomized in resource block units or in resource block group units, so that the possibility that the muting patterns overlap between a plurality of transmission points decreases. Consequently, when the muting patterns overlap in part of the resource blocks, the accuracy of interference measurement is improved by averaging the measurement result over all resource blocks. Furthermore, there is no transmission of various data or execution of channel estimation in muted resources, so that interference from other transmission points is measured with high accuracy. Also, it is not necessary to increase the density of CSI-RSs in one resource block, so that backward compatibility can be achieved. The averaged interference measurement result is reported to the CQI measurement section 308.

The channel estimation section 307 estimates the channel state based on the CSI-RS, and reports a channel estimation value to the CQI measurement section 308. The CQI measurement section 308 calculates CQI based on the interference measurement result reported from the interference measurement section 306, the channel estimation result reported from the channel estimation section 307, and the feedback mode. Note that the feedback mode may be set to one of wideband CQI, subband CQI, and best-M average. The CQI that is calculated in the CQI measurement section 308 is reported to the radio base station apparatus 20 as feedback information.

The present invention is by no means limited to the above embodiment and can be implemented in various modifications. For example, without departing from the scope of the present invention, it is possible to adequately change, in the above description, the positions to set CSI-RSs, the positions to set muting, the number of processing sections, the order of steps, the number of CSI-RSs, the count of muting, and the number of antennas, and implement these. Besides, the present invention can be implemented with various changes, without departing from the scope of the present invention.

The disclosure of Japanese Patent Application No. 2011-243984, filed on Nov. 7, 2011, including the specification, drawings, and abstract, is incorporated herein by reference in its entirety.

The invention claimed is:

1. A radio communication system comprising a mobile terminal apparatus that is able to receive a reference signal for channel state measurement, and a base station apparatus that transmits the reference signal to the mobile terminal apparatus, wherein:
   the base station apparatus comprises:
      a reference signal allocation section configured to allocate the reference signal to reference signal resources that are defined for transmission of the reference signal;
      a muting determining section configured to change arbitrary resources in the reference signal resources in resource block units or in resource block group units, a resource block group being formed with a plurality of resource blocks, and determine resources that are muted; and
      a reporting section configured to report the resources that are muted per resource block or per resource block group, to the mobile terminal apparatus; and
   the mobile terminal apparatus comprises an interference measurement section configured to measure interference using the muted resources,
   wherein the muting determining section of the base station apparatus changes the arbitrary resources in the reference signal resources from other transmission points, and sets the arbitrary resources as the muted resources.

2. The radio communication system according to claim 1, wherein the reporting section of the base station apparatus reports the muted resources in a bitmap format, in which the reference signal resources and whether or not muting is applied are associated with each other.

3. The radio communication system according to claim 1, wherein:
   the reporting section of the base station apparatus reports a fundamental muting pattern and randomizing information for randomizing the fundamental pattern in resource block units or in resource block group units; and
   the interference measurement section of the mobile terminal apparatus specifies the muted resources based on the fundamental pattern and the randomizing information, and measures interference.

4. The radio communication system according to claim 1, wherein:
   the reporting section of the base station apparatus reports a plurality of muting patterns and selection information for allowing the mobile terminal apparatus to select a muting pattern from the plurality of muting patterns in resource block units or in resource block group units; and
   the interference measurement section of the mobile terminal apparatus selects the muting pattern from the plurality of muting patterns based on the selection information, and specifies the muted resources and measures interference.

5. The radio communication system according to claim 1, wherein the reporting section of the base station apparatus reports the muted resources through higher layer signaling.

6. A base station apparatus that transmits a reference signal for channel state measurement to a mobile terminal apparatus, the base station apparatus comprising:
- a reference signal allocation section configured to allocate the reference signal to reference signal resources that are defined for transmission of the reference signal;
- a muting determining section configured to change arbitrary resources in the reference signal resources in resource block units or in resource block group units, a resource block group being formed with a plurality of resource blocks, and determine resources to be muted; and
- a reporting section configured to report the resources that are muted per resource block or per resource block group to the mobile terminal apparatus, to allow the mobile terminal apparatus to measure interference using the muted resources,
- wherein the muting determining section of the base station apparatus changes the arbitrary resources in the reference signal resources from other transmission points, and sets the arbitrary resources as the muted resources.

7. A mobile terminal apparatus that receives a reference signal for channel state measurement from a base station apparatus, the mobile terminal apparatus comprising:
- a receiving section configured to receive resources that are muted per resource block or per resource block group, from the base station apparatus that allocates the reference signal to reference signal resources that are defined for transmission of the reference signal, changes arbitrary resources in the reference signal resources in resource block units or in resource block group units, a resource block group being formed with a plurality of resource blocks, and determines the resources to be muted,
- wherein the base station apparatus changes the arbitrary resources in the reference signal resources from other transmission points, and sets the arbitrary resources as the muted resources; and
- an interference measurement section configured to measure interference using the muted resources.

8. A method of measuring interference in a radio communication system comprising a mobile terminal apparatus that is able to receive a reference signal for channel state measurement, and a base station apparatus that transmits the reference signal to the mobile terminal apparatus, the method comprising the steps of:
- in the base station apparatus:
  - allocating the reference signal to reference signal resources that are defined for transmission of the reference signal;
  - changing arbitrary resources in the reference signal resources in resource block units or in resource block group units, a resource block group being formed with a plurality of resource blocks, and determining resources that are muted; and
  - reporting the resources that are muted per resource block or per resource block group, to the mobile terminal apparatus,
  - wherein the arbitrary resources are changed in the reference signal resources from other transmission points, and the arbitrary resources are set as the muted resources;
- in the mobile terminal apparatus:
  - receiving the muted resources from the base station apparatus; and
  - measuring interference using the muted resources.

9. A radio communication system comprising a mobile terminal apparatus that is able to receive a reference signal for channel state measurement, and a base station apparatus that transmits the reference signal to the mobile terminal apparatus, wherein:
- the base station apparatus comprises:
  - a reference signal allocation section configured to allocate the reference signal to reference signal resources that are defined for transmission of the reference signal;
  - a muting determining section configured to change arbitrary resources in the reference signal resources from other transmission points, and determine resources that are muted;
  - a reporting section configured to report the resources that are muted per transmission point, to the mobile terminal apparatus,
  - wherein the muting determining section of the base station apparatus changes the arbitrary resources in the reference signal resources from other transmission points, and sets the arbitrary resources as the muted resources; and
- the mobile terminal apparatus comprises an interference measurement section configured to measure interference using the muted resources.

10. A radio communication system comprising a mobile terminal apparatus that is able to receive a reference signal for channel state measurement, and a base station apparatus that transmits the reference signal to the mobile terminal apparatus, wherein:
- the base station apparatus comprises:
  - a reference signal allocation section configured to allocate the reference signal to reference signal resources that are defined for transmission of the reference signal;
  - a muting determining section configured to change arbitrary resources in the reference signal resources in resource block units or in resource block group units, a resource block group being formed with a plurality of resource blocks, from other transmission points, and determine resources that are muted; and
  - a reporting section configured to report the resources that are muted per transmission point, to the mobile terminal apparatus,
  - wherein the muting determining section of the base station apparatus changes the arbitrary resources in the reference signal resources from other transmission points, and sets the arbitrary resources as the muted resources; and
- the mobile terminal apparatus comprises an interference measurement section configured to measure interference using the muted resources.

* * * * *